Figure 3:
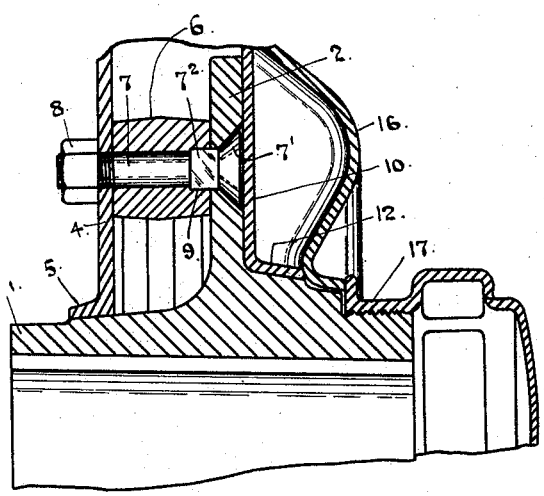

June 9, 1931.  W. N. BOOTH  1,809,231
VEHICLE WHEEL
Filed Aug. 21, 1922   3 Sheets-Sheet 1
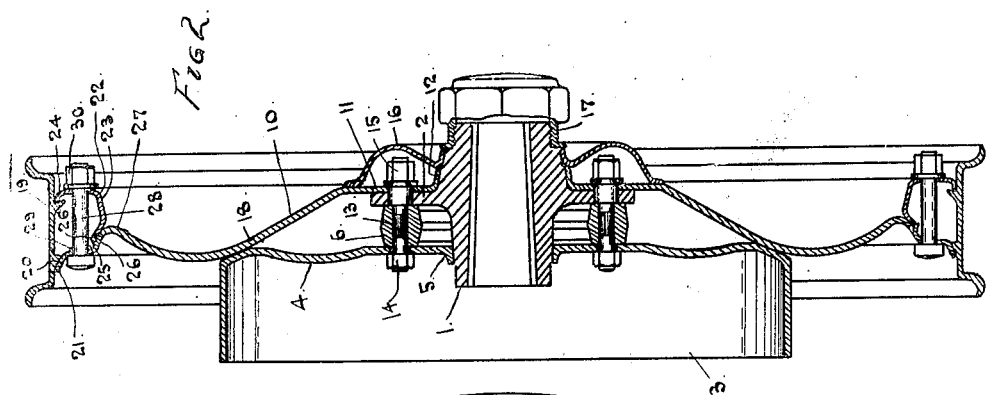
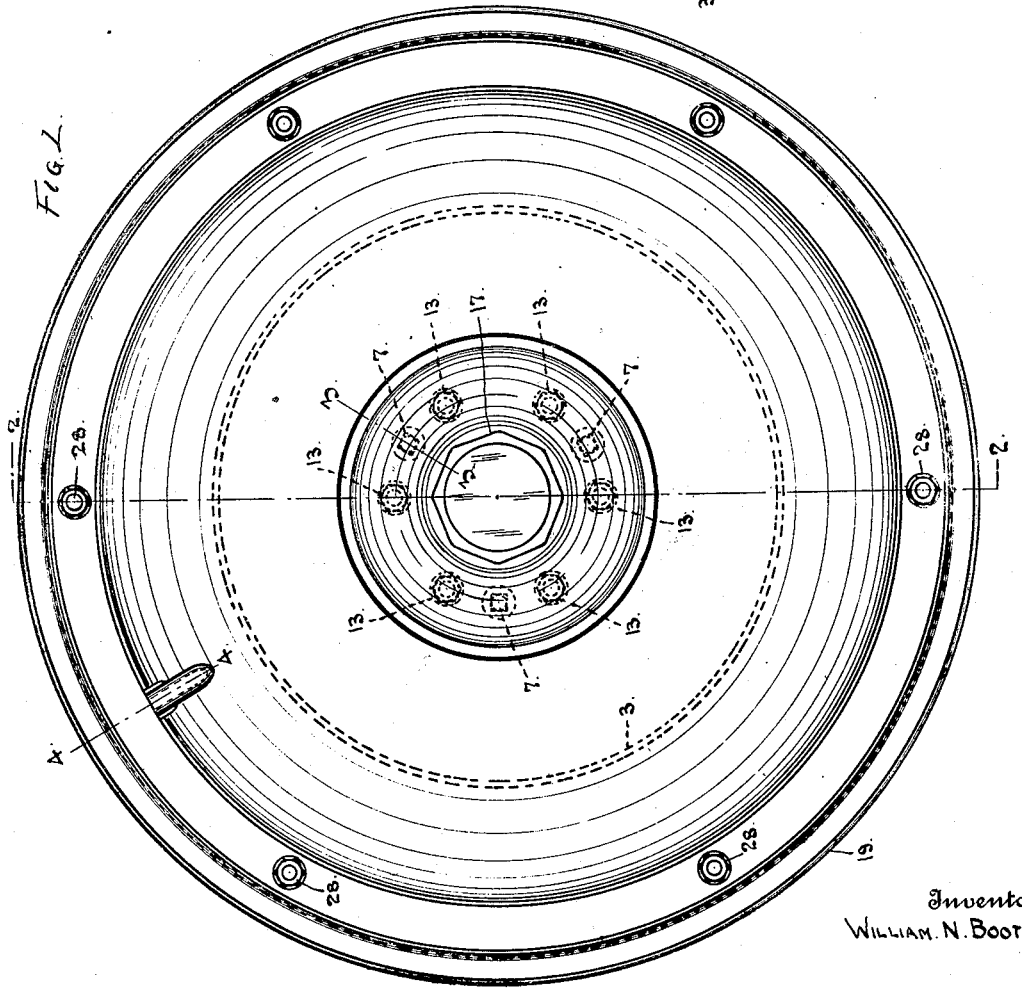
Inventor
WILLIAM. N. BOOTH.
Attorneys June 9, 1931. W. N. BOOTH 1,809,231
VEHICLE WHEEL
Filed Aug. 21, 1922 3 Sheets-Sheet 3
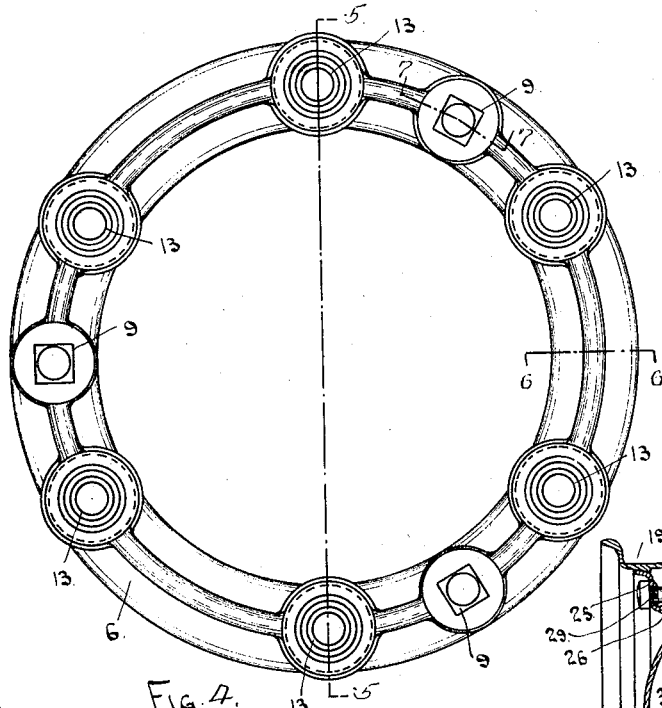
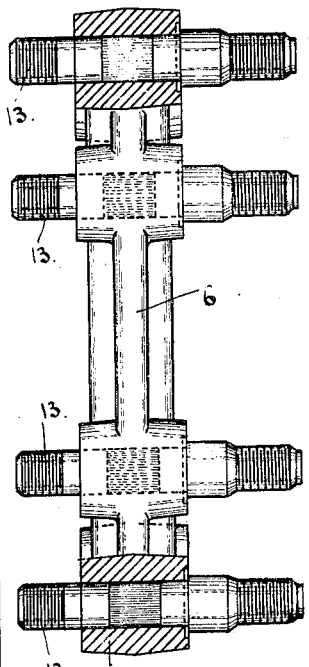
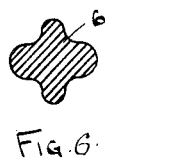
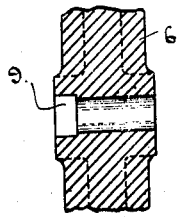
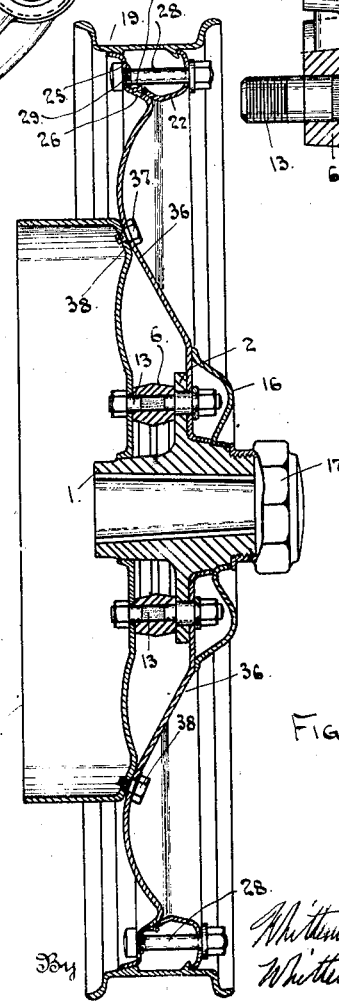
Inventor
WILLIAM N. BOOTH Patented June 9, 1931

1,809,231

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL

Application filed August 21, 1922. Serial No. 583,339.

The invention relates to vehicle wheels and refers particularly to the disk type. One of the objects of the invention is the provision of a disk wheel in which the brake drum is secured to the hub to form a unit therewith and the disk is detachably secured to the hub and braced by the brake drum.

With this as well as other objects in view, the invention resides in the novel features of construction and combinations and arrangements of parts as more fully hereinafter set forth.

In the drawings:

Figure 1 is a side elevation of a portion of a disk wheel embodying my invention;

Figures 2 and 3 are cross sections respectively on the lines 2—2 and 3—3 of Figure 1;

Figure 4 is a side elevation of the spacer;

Figures 5, 6 and 7 are cross sections respectively on the lines 5—5, 6—6 and 7—7 of Figure 4;

Figure 8 is a view similar to Figure 2 but showing a modified construction of wheel.

1 is the hub of the vehicle wheel having the annular flange 2. 3 is the brake drum having the annular flange 4 extending transversely of the axis of the hub and spaced from the annular flange 2 and also terminating in the annular foot flange 5 engaging the periphery of the hub. 6 is an annular spacer between the annular flanges 2 and 4. The brake drum forms a unit with the hub, it being secured thereto by the bolts 7, which extend through the annular flanges 2 and 4 and the spacer 6, and have the heads 7' engaging in the annular flange 2, and also by the nuts 8 engaging the inner ends of the bolts and abutting the inner side of the annular flange of the brake drum. Each of the bolts also has a polygonal portion $7^2$ engaging in a correspondingly shaped recess 9 in the spacer as shown in Figures 3, 4 and 7 particularly, to prevent rotation of the bolt while threading the nut on or off.

The wheel body is formed by the disk 10 having at its inner edge the annular radially extending portion 11 terminating in the annular foot flange 12 engageable with the periphery of the hub. The radial portion 11 extends adjacent to the outer side of the annular flange 2 of the hub, and is detachably secured thereto by means of the bolts 13 extending transversely of and preferably cast in the spacer 6 and having their ends extending through the annular flange 4 of the brake drum, the annular flange 2 of the hub, and the radial portion 11 of the disk, the portions of the bolts engaging the annular flange 2 and radial portion 11 being enlarged. Nuts 14 threaded upon the inner ends of the bolts clamp against the inner side of the brake drum annular flange, and nuts 15 threadedly engaging the outer ends of the bolts clamp the disk against the flange of the hub. An end plate 16 is detachably secured upon the hub by the hub cap 17, this plate inclosing the nuts 15 and extending adjacent to the disk 13 radially therebeyond.

For the purpose of making the structure substantial the portion of the hub engaged by the foot flange upon the disk, is tapered and the foot flange is firmly forced thereon, by means of the end plate which exerts pressure upon the ends of the foot flange. This end plate is sufficiently flexible to permit its peripheral portion to engage the disk and at the same time to permit its inner portion to engage the foot flange.

The disk 10 has the inwardly dished portion 18 which engages the brake drum 3 near its periphery, the arrangement being such that the brake drum braces the disk and makes its inner portion substantially rigid, the end plate also assisting to limit the flexing of the disk.

In the modified construction shown in Figure 8, the wheel has the same arrangement as that shown in Figures 1 and 2 with the exception that the disk 36 is detachably secured to the outer edge of the annular flange of the brake drum 37 by the cap bolts 38, by means of which the inner portion of the wheel is made rigid.

From the above description, it will be readily seen that I have provided a disk wheel in which the brake drum braces the disk forming the wheel body to form a rigid construction between the periphery of the brake drum and the hub. Also, that the resilient portion of the wheel is beyond the brake drum periphery and is located inside of the central plane of rotation or the plane of impact. Moreover, the disk is detachable from the hub and brake drum unit.

What I claim as my invention is:

1. In a vehicle wheel, the combination with the hub, of a member upon and forming a unit with said hub, a disk having a portion spaced from said member and a second portion spaced radially outward from said first-mentioned portion and in contact with said member, means for detachably securing said first mentioned portion to said hub, and an end plate detachably secured to said hub independently of said securing means and contacting with said disk radially beyond said hub for reinforcing the inner portions of the disk.

2. In a vehicle wheel, the combination with the hub having an annular flange, of a brake drum mounted upon said hub, a spacer between said brake drum and annular flange, means for securing said brake drum spacer and annular flange to each other to form a unit, a disk having an inner portion spaced from said brake drum and detachably secured to said annular flange, a portion positioned radially beyond said inner portion and detachably engaging said brake drum, and an intermediate portion means including bolts secured to said spacer for detachably securing said inner portion to said annular flange, and means concealing said securing means and engageable with said intermediate portion radially beyond said annular flange for reinforcing the inner portions of said disk.

3. In a vehicle wheel, the combination with the hub having a tapered portion, of a member upon and forming a unit with said hub, a disk having an inner portion spaced from said member and engageable with the tapered portion of said hub, said disk also having another portion spaced radially beyond said inner portion and in contact with said member, means engaging said inner portion for detachably securing said disk to said member and an end plate detachably secured upon said hub and concealing said securing means said end plate having a portion contacting with the inner portion of said disk in contact with the tapered portion of said hub and another portion contacting with said disk radially beyond said hub.

4. In a vehicle wheel, the combination with the hub having an annular flange, of a brake drum mounted upon said hub and spaced longitudinally thereof from said annular flange, means for securing said brake drum to said annular flange to form a unit, a disk having an inner portion detachably secured to the opposite side of said annular flange and a portion positioned radially beyond said inner portion in contact with said brake drum, means for detachably securing said inner portion to said annular flange, an end plate detachably secured to said hub independently of said securing means and contacting with said disk radially beyond said annular flange and a hub cap upon said hub for securing said end plate to said hub.

5. In a vehicle wheel, the combination with a hub, of a member mounted upon said hub, a disk having a portion engageable with said hub and spaced from said member and a second portion spaced radially outward from said first mentioned portion and in contact with said member, means for detachably securing said first mentioned portion to said hub, an end plate having a portion sleeved upon said hub and abutting said first mentioned portion of said disk, said end plate having another portion contacting with said disk beyond said hub and concealing said securing means, and means other than the means aforesaid for detachably securing said plate to said hub.

In testimony whereof I affix my signature.
WILLIAM N. BOOTH.